Nov. 3, 1931.        D. BOURASSA        1,830,527
SANITARY MILK BOTTLE CAP
Filed Sept. 5, 1930

Donat Bourassa
INVENTOR

BY *Victor J. Evans*
ATTORNEY

Patented Nov. 3, 1931

1,830,527

UNITED STATES PATENT OFFICE

DONAT BOURASSA, OF WATERVILLE, MAINE

SANITARY MILK BOTTLE CAP

Application filed September 5, 1930. Serial No. 479,982.

This invention relates to an improvement in the caps for milk bottles and has as its primary object to provide a cap so constructed that in a moment's time it may be arranged to constitute a spout by which milk may be poured from the bottle without the likelihood of spilling the milk or having any portion of the milk run down the sides of the bottle.

Another object of the invention is to provide a milk bottle cap which will be wholly sanitary and which may be manufactured at a comparatively small cost.

Another object of the invention is to so construct the cap that the same may have its component parts instantly adjusted to serve as a pouring spout, without the necessity of removing the cap from the bottle, and in which the co-acting flap portions may be collapsed after the desired quantity of milk has been delivered from the bottle so that the device in the closed position of the flaps will constitute as effective a seal as in its ordinary form.

This invention also consists in certain other features of construction and in the combination and arrangement of the several parts, to be hereinafter fully described, illustrated in the accompanying drawing, and specifically pointed out in the appended claims, it being understood of course that minor changes may be made so long as they fall within the scope of the claims.

In describing my invention in detail, reference will be had to the accompanying drawing, wherein like characters denote like or corresponding parts throughout the several views and in which.

Figure 5:
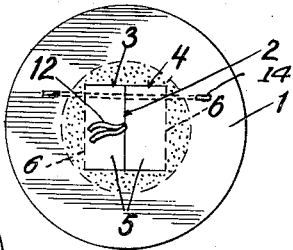
Figure 5 is a similar view of another ply of the cap.
Figure 6:
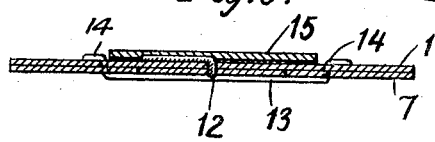
Figure 6 is a vertical transverse sectional view taken substantially on the line 6—6 of Figure 3, looking in the direction indicated by the arrows.
Figure 7:
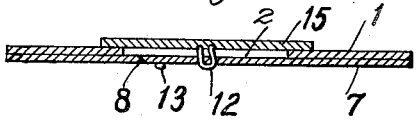
Figure 7 is a view taken at right angles to the said Figure 6.

The device embodying the invention is preferably made of two plies of paper of suitable thickness for the purpose, which plies may be adhesively united and, in the carrying out of the invention, the upper ply, which is shown in detail in Figure 5 of the drawing, is indicated in general by the numeral 1 and is provided with a diametric incision 2 and with incisions 3 and 4 leading at right angles from the ends of the incision 2 and in alignment with each other and extending in opposite directions from the said ends of the incision 2 thereby providing two flaps 5 which are integrally connected with the ply 1 along the broken line 6 shown in Figure 5.

Figure 4:
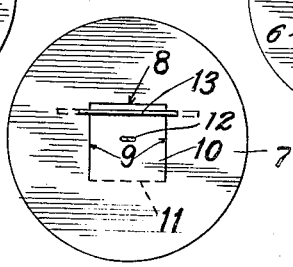
Figure 4 is a plan view of one ply of the cap.

The other ply, which constitutes the under ply, is indicated in general by the numeral 7 and is formed with a chordal incison 8 and two parallel incisions 9 leading at right angles from opposite ends of the incision 8. These incisions define a flap 10 which may be swung outwardly at right angles on the broken line 11 in Figure 4 and, in order that the flaps 5 and 10 may be simultaneously swung outwardly, a flexible pull element 12 comprising a piece of thread is fitted through the central portion of the flap 10, and being looped, has its ends led between the free end margins of the plies 5 and laid flat upon one of the side plies. In order that the flap 10 may be prevented from being pressed inwardly along its folded line 11, a cross wire 13 is anchored at its ends as at 14 in the ply 7 at opposite sides of the opening which is provided by the formation of the flap 10, this cross wire extending beneath the free end of the said flap 10.

In order that the flaps may be interiorly concealed, a disk 15 of paper or cardboard is adhesively secured to the upper side of one of the flaps 5 and will therefore extend over both of the said flaps, and as these flaps overlap the flap 10, all of the flaps together with the pull element 12 will be concealed from view.

Figure 1:
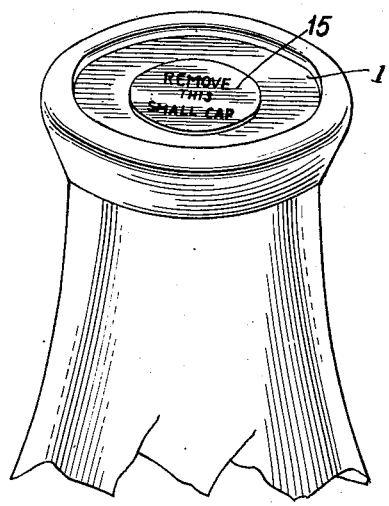
Figure 1 is a fragmentary perspective view of a milk bottle illustrating one of the caps embodying the invention arranged in the mouth thereof.
Figure 2:
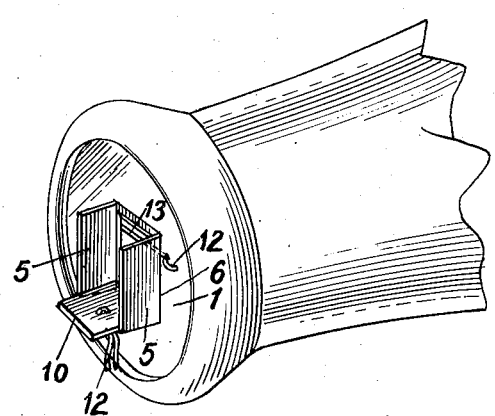
Figure 2 is a similar view illustrating the flaps to constitute a pouring spout and showing the bottle tilted to pouring position.
Figure 3:
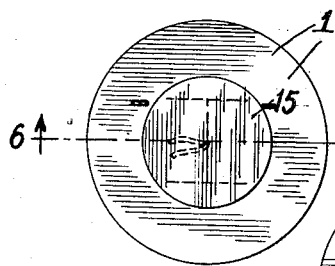
Figure 3 is a top plan view of one of the caps.

From the foregoing description it will be evident that the disk 15 is grasped at its non-adhering side and pulled backwardly, which may be torn loose from the flap 5 to which it was initially secured, and the flexible pull element 12 then grasped and a pull exerted thereon to cause outward swinging of the flap 10 and, the outward swinging of this flap will result in outward swinging of the flap 5 so that the three flaps will assume a position such as shown in Figure 2 of the drawings, and the pouring spout, referred to above, will be in this manner provided. It will be understood of course that after the desired quantity of milk has been poured from the bottle, the flaps may be closed and the bottle may be sealed until a further quantity of milk is desired for use.

The cap as shown and described may be formed from two separate and distinct plies of paper, cut to provide the spout parts prior to being united, but it will be obvious that the spout can be formed with bottle caps now generally employed for milk bottles, and in this event, the cap will be split a distance to allow for the necessary incisions to be made in the respective split portions, and after the incisions are made, the parts of the cap can be secured together.

While I have shown and described a cross wire 13 to prevent the flap 10 from being pressed inwardly along its folded line 11, this cross wire may be dispensed with in practice if desired.

What I claim is:

1. A milk bottle cap comprising mutually united top and bottom plies, the top ply having incisions therein to define two flaps which may be swung outwardly, and the bottom ply having incisions therein to define a single flap which may be swung outwardly to extend between the first mentioned flaps and thereby provide a pouring spout.

2. A milk bottle cap comprising mutually united top and bottom plies, the top ply having incisions therein to define two flaps which may be swung outwardly, the bottom ply having incisions therein to define a single flap which may be swung outwardly to extend between the first mentioned flaps and thereby provide a pouring spout, and a pull element upon the flap of the bottom ply.

3. A milk bottle cap comprising mutually united top and bottom plies, the top ply having incisions therein to define two flaps which may be swung outwardly, the bottom ply having incisions therein to define a single flap which may be swung outwardly to extend between the first mentioned flaps and thereby provide a pouring spout, and a flexible pull element upon the flap of the bottom ply.

4. A milk bottle cap comprising mutually united top and bottom plies, the top ply having incisions therein to define two flaps which may be swung outwardly, the bottom ply having incisions therein to define a single flap which may be swung outwardly to extend between the first mentioned flaps and thereby provide a pouring spout, means secured to said cap to prevent inward movement of the flaps and a circular disk adhesively secured to the outer side of one of the side flaps.

5. A milk bottle cap comprising mutually united top and bottom plies, the top ply having incisions therein defining a pair of outwardly swingable flaps, the bottom ply having incisions therein to define a single flap swingable at right angles between the first mentioned flaps to provide a pouring spout, and means to prevent inward movement of the flaps.

6. A milk bottle cap comprising mutually united top and bottom plies, the top ply having incisions therein defining a pair of outwardly swingable flaps, the bottom ply having incisions therein to define a single flap swingable at right angles between the first mentioned flaps to provide a pouring spout, and a stop located in the path of inward movement of the single flap.

In testimony whereof I affix my signature.

DONAT BOURASSA.